(12) United States Patent
Deng et al.

(10) Patent No.: US 8,095,082 B2
(45) Date of Patent: Jan. 10, 2012

(54) DUAL BAND RADIO FREQUENCY TRANSMITTER

(75) Inventors: Junxiong Deng, San Diego, CA (US); Maulin Pareshbhai Bhagat, San Diego, CA (US); Gurkanwal Singh Sahota, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 573 days.

(21) Appl. No.: 11/870,365

(22) Filed: Oct. 10, 2007

(65) Prior Publication Data

US 2009/0098831 A1    Apr. 16, 2009

(51) Int. Cl.
*H04B 1/02* (2006.01)
*H04B 1/04* (2006.01)
*H01Q 11/12* (2006.01)

(52) U.S. Cl. ........ 455/91; 455/118; 455/124; 455/127.4

(58) Field of Classification Search .................... 455/91, 455/120, 124–125, 127.1, 127.4, 292, 118
See application file for complete search history.

(56) References Cited

U.S. PATENT DOCUMENTS

| 5,986,617 | A | 11/1999 | McLellan |
| 6,009,318 | A | 12/1999 | Freed |
| 7,129,803 | B2 | 10/2006 | Khorram et al. |
| 7,199,679 | B2 | 4/2007 | Mondal |
| 7,526,256 | B2 | 4/2009 | Bhatti et al. |
| 2005/0208917 | A1* | 9/2005 | Roufoogaran et al. ........ 455/296 |
| 2007/0298731 | A1* | 12/2007 | Zolfaghari ...................... 455/91 |
| 2008/0274712 | A1* | 11/2008 | Rofougaran .................. 455/333 |
| 2008/0278258 | A1* | 11/2008 | Liu .................................. 333/25 |
| 2009/0036067 | A1* | 2/2009 | Rofougaran .................... 455/91 |

FOREIGN PATENT DOCUMENTS

EP    0772304 A2    5/1997

OTHER PUBLICATIONS

International Search Report and Written Opinion—PCT/US2008/079293, International Search Authority—European Patent Office—Jun. 3, 2009.

* cited by examiner

*Primary Examiner* — Simon Nguyen
(74) *Attorney, Agent, or Firm* — Ramin Mobarhan

(57) ABSTRACT

A transmitter includes a transformer and a transformer tuning circuit. The transformer transforms a differential radio frequency (RF) signal to a single-ended RF signal. The transformer tuning circuit tunes the transformer to permit the transmitter to transmit the single-ended RF signal in a first frequency band (e.g., cellular frequency band) or a second frequency band (e.g., PCS frequency band).

26 Claims, 6 Drawing Sheets

300
Wireless Communication Device

FIG. 5

| Ctune/Ctune2 (pF) | BB Input | Freq (Hz) | Ida (mA) | Pout (dBm) | ACPR @7dBm |
|---|---|---|---|---|---|
| 0/0 | 0.6 | 1.95G | 25.68 | 10.13 | 53.8 dBc |
| 0/0 | 0.6 | 850M | 20.69 | -14.40 | n/a |
| 3.7/1 | 0.6 | 850M | 21.86 | 4.04 | 53.6 dBc |
| 3.7/1 | 0.8 | 850M | 25.52 | 9.95 | 53.6 dBc |

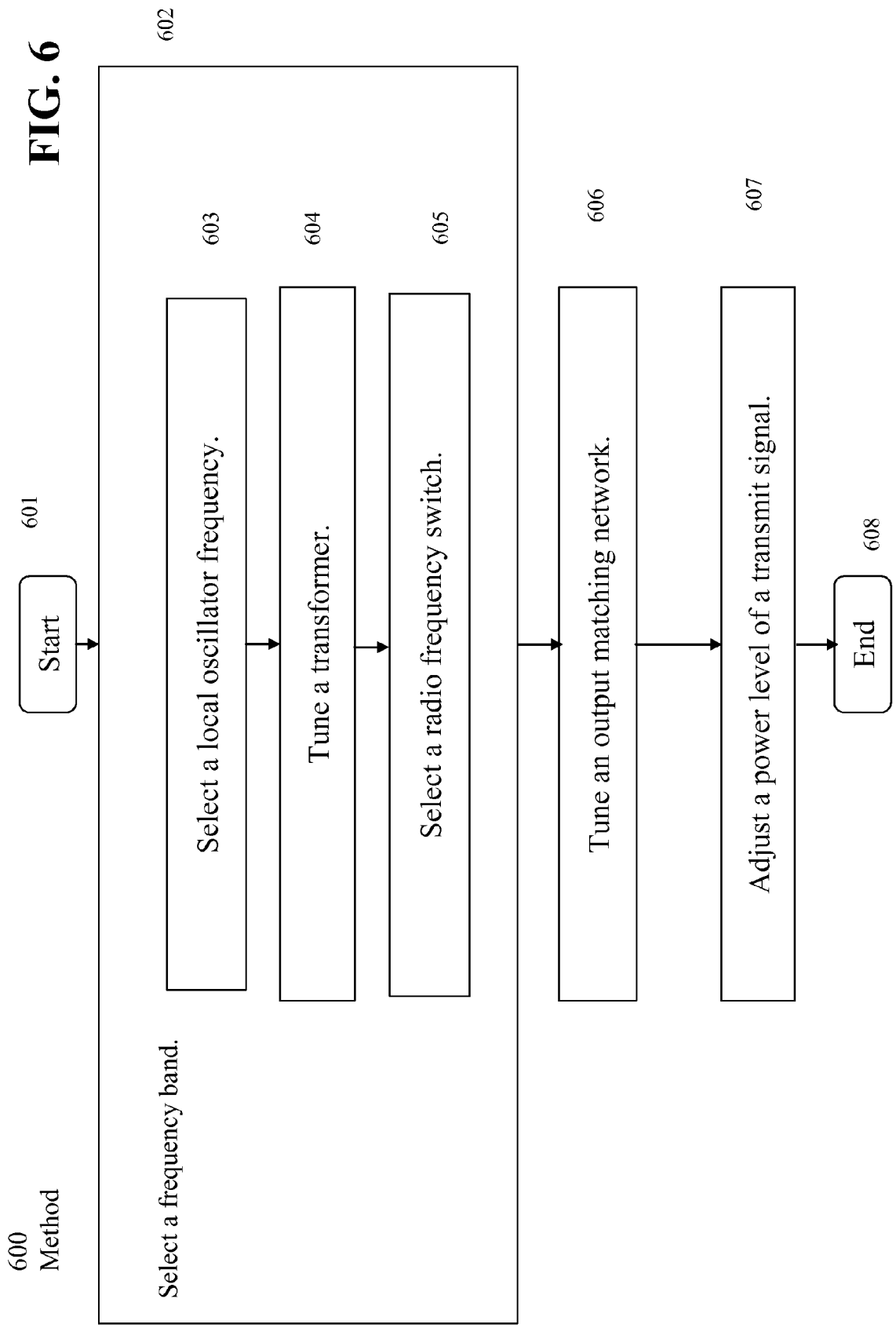

US 8,095,082 B2

DUAL BAND RADIO FREQUENCY TRANSMITTER

FIELD OF THE INVENTION

The present invention generally relates to radio frequency communications. More particularly, the present invention relates to a dual band radio frequency transmitter.

BACKGROUND OF THE INVENTION

Advances in technology for wireless communication devices, such as cellular telephones, enable characteristics, such as cost, size, weight, and power, of the devices to be reduced while maintaining or improving performance standards of the devices, thereby improving the portability of the devices to the point where the devices are now commonly used as a replacement for conventional landline telephones.

One effective approach to reducing the cost and size of wireless communication devices is to use the same component for more than one function of a device. This approach may be known as increasing component integration or circuit reuse.

While the advances have improved the portability of the devices, consumers of the devices continue to demand more functions and services for the devices. For example, manufacturers of the devices have developed devices that operate at two or more frequency bands (i.e., multiple bands), for example, two frequency bands, to permit the devices to operate within an environment having more than one communications network. For example, a cellular telephone that operates at two frequency bands may be referred to as a dual band cellular telephone.

One exemplary environment having more than one communications network is a cellular communications network operating according to standards known as Code Division Multiple Access (CDMA), operating in a frequency band having a carrier frequency around 850 MHz, and as Personal Communications System (PCS) operating in a frequency band having a carrier frequency around 1950 MHz. Another exemplary environment is a cellular communications network operating according to standards known as GSM (Global System for Mobile communications), operating in a frequency band having a carrier frequency around 900 MHz for Standard GSM, and as Digital Communications System (DCS) operating in a frequency band having a carrier frequency around 1800 MHz for DCS 1800. Various other examples of combinations of standards in communications networks, digital or analog, are known or possible.

A wireless communication device transmits and receives signals for communication to occur. A transmitter, either separate from or part of a transceiver, transmits the signals for the wireless communication device. A transmitter typically accepts baseband signals, internally generated by the device, for transmission. The baseband signal may be in the form of a digital signal, known as a complex signal, such as In-phase (I) and Quadrature-phase (Q) signals. Typically, a transmitter subsequently performs forms of digital-to-analog conversion, frequency modulation, and power amplification of the baseband signals.

A wireless communication device that operates in more than one frequency band needs to transmit signals in each frequency band, thereby requiring more than one transmit function. For example, this may require having more than one separate function for each function of digital-to-analog conversion, frequency modulation, and power amplification. In particular, for example, a dual band transmitter may be implemented with two separate transmit signal paths, one for a high frequency band transmitter (e.g. 1950 MHz) and another for a low frequency band transmitter (e.g. 850 MHz). However, two separate transmit signal paths increase the cost and size (e.g., integrated circuit die area) of the wireless communication device to support dual band capability.

Advances in technology of wireless communication devices enable the cost and size of a dual band transmitter to be reduced while maintaining or improving performance standards of the devices, as shown in FIGS. 1 and 2, for example. FIGS. 1 and 2 illustrate a block diagram representation of first 100 and second 200 dual band radio frequency (RF) transmitters, respectively, according to the prior art.

In FIG. 1, the dual band RF transmitter 100 includes a baseband filter 102, a voltage controlled oscillator (VCO) 108, a local oscillator (LO) buffer 110, two frequency dividers 112 (divide by 4) and 114 (divide by 2), two mixers 104 and 106, two RF variable gain amplifiers (VGA) 116 and 124, two transformers 118 and 126, two driver amplifiers (DA) 120 and 128, and two RF SAW filters 122 and 130. FIG. 1 describes the area in terms of width and length (w/L) needed on an integrated circuit die using a 180 nanometer CMOS semiconductor manufacturing process for each of the two mixers 104 and 106, the two RF VGAs 116 and 124, and the two DAs 120 and 128. The baseband filter 102, the VCO 108, the LO buffer 110, the frequency divider 112 (divide by 4), the mixer 104, the RF VGA 116, the transformer 118, the DA 120, and the RF SAW filter 122 provide elements for a first transmit path configured to generate transmit signals in the cellular frequency band, for example. The baseband filter 102, the VCO 108, the LO buffer 110, the frequency divider 114 (divide by 2), the mixer 106, the RF VGA 124, the transformer 126, the DA 128, and the RF SAW filter 130 provide elements for a second transmit path configured to generate transmit signals in the PCS frequency band, for example. The baseband filter 102, the VCO 108, and the LO buffer 110 are common to and reused for each of the first and second transmit paths, thereby reducing the integrated circuit die area and associated cost for these common elements.

In FIG. 2, the dual band RF transmitter 200 includes a baseband filter 102, a VCO 108, a LO buffer 110, two frequency dividers 112 (divide by 4) and 114 (divide by 2), a buffer 132, one mixer 104, one RF VGA 116, two transformers 118 and 126, two DAs 120 and 128, and two RF SAW filters 122 and 130. FIG. 2 describes the area in terms of width and length (w/L) needed on an integrated circuit die using a 180 nanometer CMOS process for each of the mixer 104, the RF VGA 116, and the two DAs 120 and 128. The baseband filter 102, the VCO 108, the LO buffer 110, the frequency divider 112 (divide by 4), the buffer 132, the mixer 104, the VGA 116, the transformer 118, the DA 120, and the RF SAW filter 122 provide elements for a first transmit path configured to generate transmit signals in the cellular frequency band, for example. The baseband filter 102, the VCO 108, the LO buffer 110, the frequency divider 114 (divide by 2), the buffer 132, the mixer 104, the VGA 116, the transformer 126, the DA 128, and the RF SAW filter 130 provide elements for a second transmit path configured to generate transmit signals in the PCS frequency band, for example. The baseband filter 102, the VCO 108, and the LO buffer 110, the buffer 132, the mixer 104, and the VGA 116 are common to and reused for each of the first and second transmit paths, thereby saving the integrated circuit die area and associated cost for these common elements. Therefore, the dual band transmitter 200 in FIG. 2 reduces the integrated circuit die area and associated cost needed for the mixer 106 and the VGA 124 used in the dual band transmitter 100 in FIG. 1 by adding a much smaller integrated circuit die area and associated cost for the buffer 132 than what was reduced.

Accordingly, it is desirable to continue to reduce the integrated circuit die area and associated cost needed for a dual band transmitter even more than what is described for the dual band transmitters 100 and 200, shown in FIGS. 1 and 2, respectively, while continuing to maintain or improve performance.

SUMMARY

The present invention provides a wireless communication device, a radio frequency integrated circuit, a radio frequency transmitter, a method, an apparatus, and/or a system. The apparatus may include data processing systems, which perform the method, and computer readable media storing executable applications which, when executed on the data processing systems, cause the data processing systems to perform a method.

According to one aspect of the present invention, a transmitter includes a transformer and a transformer tuning circuit. The transformer transforms a differential radio frequency (RF) signal to a single-ended RF signal. The transformer tuning circuit tunes the transformer to permit the transmitter to transmit the single-ended RF signal in a first frequency band (e.g., cellular frequency band) or a second frequency band (e.g., PCS frequency band), different from the first frequency band.

These and other aspects of the present invention will be apparent from the accompanying drawings and from the following detailed description.

BRIEF DESCRIPTION OF THE DRAWINGS

Aspects of the present invention are illustrated by way of examples and not limitation in the figures of the accompanying drawings, in which like reference numbers designate corresponding elements.

FIG. 5 illustrates a table of characteristics for the radio frequency transmitter, as illustrated in FIG. 4, according to one aspect of the present invention.

FIG. 6 illustrates a method performed by the radio frequency transmitter, as illustrated in FIG. 4, according to one aspect of the present invention.

DETAILED DESCRIPTION

The following description and drawings are illustrative of the invention and are not to be construed as limiting the invention. Numerous specific details are described to provide a thorough understanding of the present invention. However, in certain instances, well-known or conventional details are not described in order to avoid obscuring the description of the present invention. References to one embodiment or an embodiment in the present disclosure are not necessarily to the same embodiment, and such references include one or more embodiments.

Figure 3:
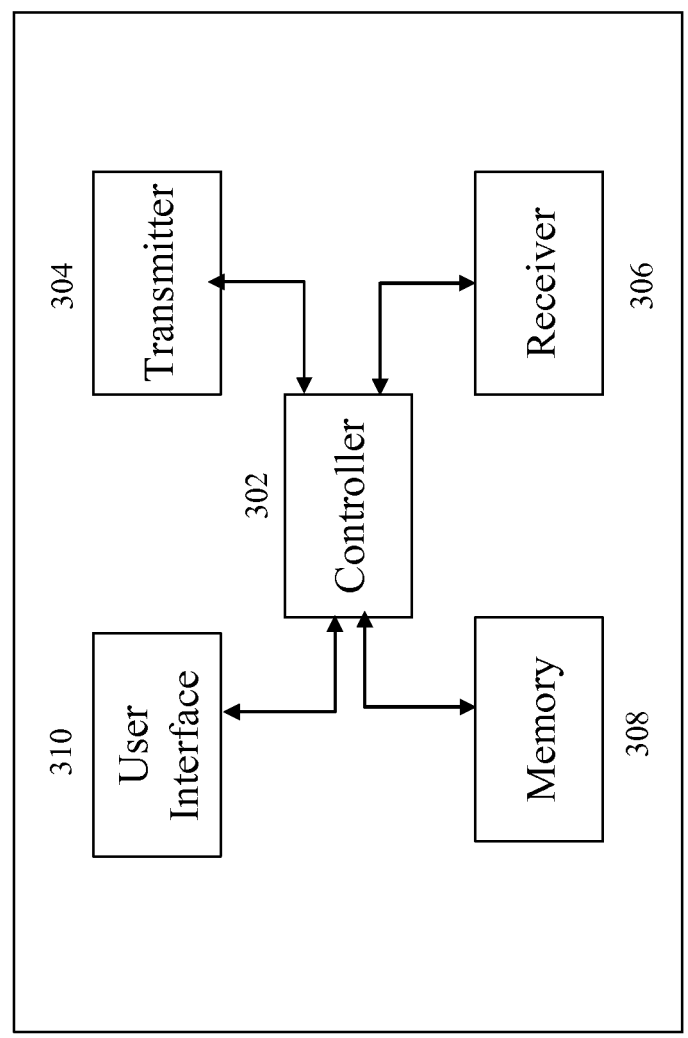
FIG. 3 illustrates a block diagram representation of a wireless communication device, according to one aspect of the present invention.

FIG. 3 illustrates a block diagram representation of a wireless communication device 300, according to one aspect of the present invention. The device 300 may be any type of device such as, for example, a cellular telephone, otherwise referred to as a mobile telephone, a cell phone, a radio telephone, a portable phone, mobile station, cordless phone, etc. The device 300 may employ any type of wireless technology using any part of the frequency spectrum, including, for example, radio frequency and infrared frequency.

Typically, the device 300 communicates with a communications network (not shown), according to one or more communication standards or protocols, such as via one or more base stations (BS) (not shown) to communicate with other wireless communication devices or other devices, such as landline telephones, computers, servers, etc., but may communicate directly with other wireless communication devices, without going through the communications network. Although the examples presented herein relate to specific communication standards or protocols, the principles of the present invention are generally applicable to any form of wireless communication. The communication standards or protocols refer to any standard or protocol, such as, for example, CDMA, TDMA, FDMA, GSM, PCS, or combinations thereof.

The device 300 may be fixed (i.e., stationary) and/or mobile (i.e., portable). The device 300 may be implemented in a variety of forms including, but not limited to, one or more of the following: a cellular telephone, a personal computer (PC), a desktop computer, a laptop computer, a workstation, a minicomputer, a mainframe, a supercomputer, a network-based device, a data processor, a personal digital assistant (PDA), a smart card, a pager, and a wristwatch.

The device 300 includes, among other elements, a controller 302, a transmitter 304, a receiver 306, a memory 308, and a user interface 310. Other elements typically found in a wireless communication device, which are not shown, but may include, for example, an antenna, a power supply, and a global positioning receiver.

The controller 302, otherwise referred to as a processor, controls functions of the transmitter 304, the receiver 306, the memory 308, and the user interface 310 by providing control signals to such elements. The controller 302 may provide the control signals in response to receiving input signals from one or more of such elements. The transmitter 304 transmits communication signals to a BS receiver (not shown). The receiver 306 receives communication signals from a BS transmitter (not shown).

The transmitter 304 and the receiver 306 together provide a transceiver for performing functions required for processing communication signals transmitted and received, respectively, over a communication link. The communication link, otherwise referred to as a communication channel or communication path, is typically a radio frequency communication link to another component, such as one or more base stations (not shown).

The memory 308 represents any type of data storage device, such as computer memory devices or other tangible or computer-readable storage medium, for example. The memory device represents one or more memory devices, located at one or more locations, and implemented as one or more technologies, depending on the particular implementation of the device 300. In addition, the memory 308 may be of any type readable by the controller 302 and capable of storing data and/or a series of instructions embodying a process.

Examples of the memory device include, but are not limited to, RAM, ROM, EPROM, EEPROM, PROM, disk (hard or floppy), CD-ROM, DVD, flash memory, etc.

The user interface 310 may further provide a data input device and a data output device (each not shown). The data input device typically provides data to the controller 302 in response to receiving input data either manually from a user or automatically from another electronic device. For manual input, the data input device may be a keyboard and a mouse, but also may be a touch screen, a keypad, or a microphone and a voice recognition application, for example.

The data output device typically provides data from the controller for use by a user or another electronic device. For output to a user, the data output device may be a display that generates one or more display images in response to receiving the display signals from the controller 302, but also may be a speaker or a printer, for example. Examples of display images include, for example, text, graphics, video, photos, images, graphs, charts, forms, numerals, etc.

Figure 4:
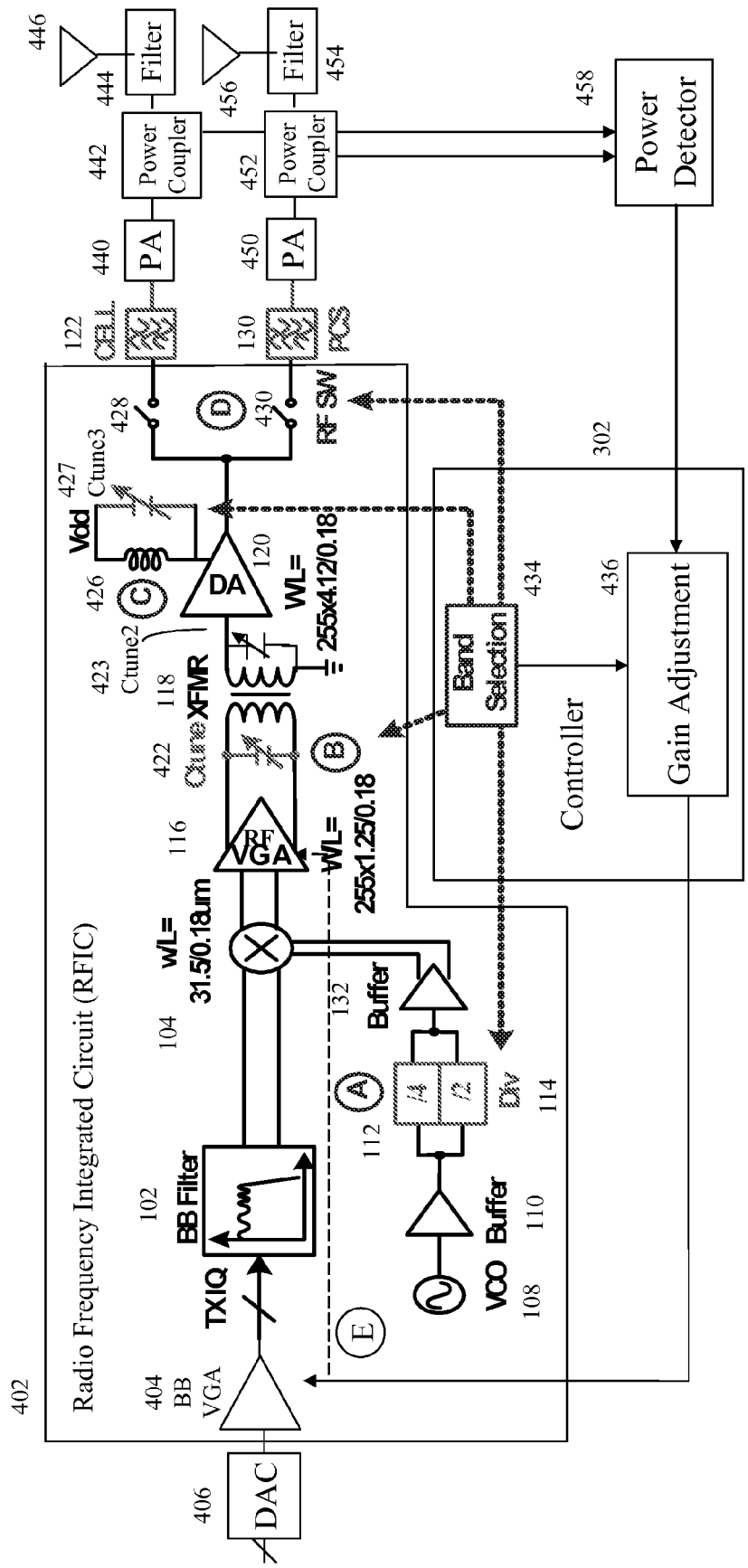
FIG. 4 illustrates a block diagram representation of a radio frequency transmitter, according to one aspect of the present invention.

FIG. 4 illustrates a block diagram representation of the transmitter 304 controlled by the controller 302, according to one aspect of the present invention. The transmitter 304 is implemented as a dual band transmitter.

A portion of the transmitter 304 is implemented as a radio frequency integrated circuit (RFIC) 402, for example. The RFIC 402 includes a baseband (BB) variable gain amplifier (VGA) 404, a baseband filter 102, a VCO 108, a LO buffer 110, two frequency dividers 112 (divide by 4) and 114 (divide by 2), a buffer 132, one mixer 104, one RF VGA 116, one transformer 118, a transformer tuning circuit 422 and 423, one driver amplifier 120, an output matching network 426 with tuning 427, and two RF switches 428 and 430. Individually, as separate elements, the functions of the each of the elements in the RFIC 402 are well known in the art. Integrating these elements in an integrated circuit permits the device 300 to be manufactured for less cost and smaller size. Alternatively, one or more elements shown in FIG. 4 as being inside the RFIC 402 may be implemented outside the RFIC 402.

Outside the RFIC 402, the transmitter 304 further includes one digital to analog converter (DAC) 406, two RF SAW filters 122 and 130, two power amplifiers (PA) 440 and 450, two power couplers 442 and 452, two filters 444 and 454, two antennae 446 and 456, and at least one power detector 458. Individually, as separate elements, the functions of the each of the elements outside the RFIC 402 are well known in the art. Advances in technology may permit the use of only one RF SAW filter 122, one power amplifier (PA) 440, one power coupler 442, one filter 444, and one antenna 446, when such elements can support more than one transmit frequency band. Further, advances in technology may permit some of the functions provided by the one or two RF SAW filters 122 and 130, one or two power amplifiers (PA) 440 and 450, one or two power couplers 442 and 452, one or two filters 444 and 454, and one or two antennae 446 and 456 to be combined with functions of other elements in one or both transmit paths or eliminated from one or both transmit paths. Further, one or more elements shown in FIG. 4 as being outside the RFIC 402 may be implemented inside the RFIC 402.

The DAC 406, the BB VGA 404, the baseband filter 102, the VCO 108, the LO buffer 110, the frequency divider 112 (divide by 4), the buffer 132, the mixer 104, the VGA 116, the transformer 118, transformer tuning circuit 422 and 423, the driver amplifier 120, the output matching network 426 with tuning 427, and the RF switch 428 provide elements in the RFIC 402 for a first transmit path configured to generate transmit signals in the cellular frequency band, for example.

The DAC 406, the BB VGA 404, the baseband filter 102, the VCO 108, the LO buffer 110, the frequency divider 114 (divide by 2), the buffer 132, the mixer 104, the VGA 116, the transformer 118, transformer tuning circuit 422 and 423, the driver amplifier 120, the output matching network 426 with tuning 427, and the RF switch 430 provide elements for a second transmit path configured to generate transmit signals in the PCS frequency band, for example.

The DAC 406, the BB VGA 404, the baseband filter 102, the VCO, and the LO buffer 110, the buffer 132, the mixer 104, the VGA 116, the transformer 118, transformer tuning circuit 422 and 423, the driver amplifier 120, and the output matching network 426 with tuning 427 are common to and reused for each of the first and second transmit paths, thereby saving the integrated circuit die area and associated cost for these common elements. Therefore, the dual band transmitter 304 in FIG. 4 further reduces the integrated circuit die area and associated cost needed for the transformer 126 and the driver amplifier 128 used in the dual band transmitter 200 in FIG. 2, which are eliminated in the dual band transmitter 304 in FIG. 4. FIG. 4 describes the area in terms of width and length (w/L) needed on an integrated circuit die using a 180 nanometer CMOS process for each of the mixer 104, the VGA 116, and the driver amplifier 120.

Generally, in operation, the digital transmit baseband signals (e.g., double-ended or differential quadrature I and Q signals) are converted from digital signals into the analog signals by the DAC 406, gain-adjusted by the BB VGA 404, filtered with the baseband filter 102, and frequency up-converted by the mixer 104 to generate differential transmit RF signals in response to receiving one of the two local oscillator frequency signals from dividers 112 or 114. The VGA 116 provides power and/or gain control for the received differential transmit RF signals. The transformer 118 transforms the gain controlled differential transmit RF signals at the output of the VGA from a double-ended signal at the primary side of the transformer 118 into a single-ended signal at the secondary side of the transformer 118. The driver amplifier 120 provides the power/gain control as well as signal amplification for the single-ended signal for output by the RFIC 402 via one of the RF switches 428 or 430.

The controller 302 includes control functions for frequency band selection 434 and a gain adjustment 436 to cause the transmitter 304 to operate at a first transmit frequency band (e.g., a low frequency band, such as cellular frequency band) or at a second transmit frequency band (e.g., a high frequency band, such as PCS frequency band). The first and second transmit frequency bands may be any two transmit frequency bands adapted to transmit any two transmit frequency signals. Further, more than two transmit frequency bands adapted to transmit more than two transmit frequency signals may be implemented.

The frequency band selection 434 provides control signals to control portions of the transmitter 304 generally identified as A, B, C, and D. The frequency band selection 434 provides control signals to control transmitter portion A by selecting the divider 112 (divide by 4) or the divider 114 (divide by 2). The frequency band selection 434 provides control signals to control transmitter portion B by tuning the capacitors 422, Ctune, and 423, Ctune2, otherwise called capacitance tuning tanks, to particular values. The frequency band selection 434 provides control signals to control transmitter portion C by tuning the capacitor 427, Ctune3, to a particular value. The frequency band selection 434 provides control signals to control transmitter portion D by selecting either RF switch 428 or RF switch 430.

The gain adjustment 436 provides control signals to control portions of the transmitter 304 generally identified as E. The gain adjustment 436 provides control signals to control transmitter portion E by adjusting the power level of the transmit signal, Tx IQ, to a particular value. The power level of the transmit signal may be adjusted by adjusting the output amplitude of the BB VGA 404 at the baseband frequency and/or by adjusting the gain of the RF VGA 116 at the radio frequency, or in other desired ways. The power level of the input signal may be adjusted in response to a feedback signal from power amplifier 440 or 450, via power couplers 442 or 452, respectively, as measured by power detector 458, or may be adjusted by a predetermined value without using the feedback signal.

The controller 302 causes the transmitter 304 to operate at the first transmit frequency (e.g., a low band, cellular frequency) by enabling the frequency band selection 434 to select the divider 112 (divide by 4), to tune the capacitor 422, Ctune, to 3.7 pF, to tune the capacitor 423, Ctune2, to 1.0 pF, and to select RF switch 428. The controller 302 further causes the transmitter 304 to operate at the first transmit frequency (e.g., a low band, cellular frequency) by tuning the output matching network (OMN), for example, by tuning capacitor 427, Ctune3, to optimize the output power. The controller 302 further causes the transmitter 304 to operate at the first transmit frequency (e.g., a low band, cellular frequency) by enabling the gain adjustment 436 to adjust a baseband input power level of the transmit signal, Tx IQ, to 0.6.

The controller 302 causes the transmitter 304 to operate at the second transmit frequency (e.g., a high band, PCS frequency) by enabling the frequency band selection 434 to select the divider 112 (divide by 2), to tune the capacitor 422, Ctune, to 0.0 pF, to tune the capacitor 423, Ctune2, to 0.0 pF, and to select RF switch 430. The controller 302 further causes the transmitter 304 to operate at the second transmit frequency (e.g., a high band, PCS frequency) by tuning the output matching network (OMN), for example, by tuning capacitor 427, Ctune3, to optimize the output power. The controller 302 further causes the transmitter 304 to operate at the second transmit frequency (e.g., a high band, PCS frequency) by enabling the gain adjustment 436 to adjust the baseband input power level of the transmit signal, Tx IQ, to 0.8.

The capacitors 422, Ctune, and 423, Ctune2, form capacitance tuning tanks at the primary (i.e., input) and secondary (i.e., output) sides, respectively, of the transformer 118 for tuning the transformer 118. The capacitor 427, Ctune3, tunes the output matching network (OMN) 426 for the driver amplifier 120. The tunable OMN 426 provides an optimal output power level at the desired frequency band by maintaining the output impedance at a desired value, such as 50 ohms. Although two capacitors 422 and 423 are used to tune the transformer 118 and one capacitor 427 is used to tune the output matching network 426, the number and location of capacitors for each element may vary. For example, the capacitor 423, Ctune2, may be located at the output (i.e., the secondary side) of the transformer 118, either alone, alternatively to, or in combination with the capacitor 422, Ctune, located at the input (i.e., the primary side) of the transformer 118. Further, other techniques or elements, rather than tuning a capacitor, may be used to vary the frequency characteristics of the transformer 118 and/or the impedance characteristics of the output matching network 426.

FIG. 5 illustrates a table 500 of characteristics for the transmitter 304, as illustrated in FIG. 4, according to one aspect of the present invention. The table 500 includes columns 501 to 506 and rows 507 to 510.

Column 501, described as "Ctune/Ctune2 (pF)," describes capacitor values for tuning capacitors 422 and 423. The capacitor values for tuning capacitors 422 and 423 are adjusted by the band selection 434 part of the controller 302. The capacitor values are determined by design, experimentation, and/or testing in order to provide for appropriate performance of the transmitter 304 while transmitting the transmit signal in one of the first and second frequency bands. For example, the capacitors 422 and 423 are tuned to 3.7 pF and 1.0 pF, respectively, to enable the transmitter 304 to transmit an appropriate signal in the first frequency band (e.g., low frequency band for cellular). Further, for example, the capacitors 422 and 423 are each tuned to 0.0 pF to enable the transmitter 304 to transmit an appropriate signal in the second frequency band (e.g., high frequency band for PCS).

Column 502, described as "BB Input," describes the baseband input power level for transmit signal, Tx IQ. The baseband input power level for transmit signal, Tx IQ, is adjusted by the gain adjustment 436 part of the controller 302. The baseband input power level for transmit signal, Tx IQ, is determined by design, experimentation, and/or testing in order to provide for appropriate performance of the transmitter 304 while transmitting the transmit signal in one of the first and second frequency bands. For example, the baseband input power level for transmit signal, Tx IQ, is adjusted be 0.8 to enable the transmitter 304 to transmit an appropriate signal in the first frequency band (e.g., low frequency band for cellular). Further, for example, the baseband input power level for transmit signal, Tx IQ, is adjusted be 0.6 to enable the transmitter 304 to transmit an appropriate signal in the second frequency band (e.g., high frequency band for PCS).

Column 503, described as "Frequency (Hz)," describes the desired transmit frequency bands. The desired transmit frequency bands are selected by the band selection 434 part of the controller 302 by selecting a local oscillator frequency, via one of the frequency dividers 112 and 114, tuning the transformer 118, by tuning the transformer 118, and by selecting a corresponding RF switch 428 and 430. The desired transmit frequency bands are determined by design, experimentation, and/or testing in order to provide for appropriate performance of the transmitter 304 while transmitting the transmit signal in one of the first and second frequency bands. For example, the transmit frequency band is selected be 850 MHz to enable the transmitter 304 to transmit an appropriate signal in the first frequency band (e.g., low frequency band for cellular). Further, for example, the transmit frequency band is selected be 1.95 GHz to enable the transmitter 304 to transmit an appropriate signal in the second frequency band (e.g., high frequency band for PCS).

Column 504, described as "Ida (mA)," describes the current for the driver amplifier 120. The current for the driver amplifier 120 is a performance characteristic of the transmitter 304 that is measured, or otherwise determined, when the transmitter 304 transmits the transmit signal in one of the first and second frequency bands. For example, an acceptable current to enable the transmitter 304 to transmit an appropriate signal in the either the first or the second frequency band is about 25 mA.

Column 505, described as "Pout (dBm)," describes the output power of the transmitter 304 after the RF switches 428 and 430 and before and SAW filters 122 and 130, respectively. The output power of the transmitter 304 is a performance characteristic of the transmitter 304 that is measured, or otherwise determined, when the transmitter 304 transmits the transmit signal in one or both of the first and second frequency bands. For example, an output power of the transmitter 304 to enable the transmitter 304 to transmit an appropriate signal in the one or both of the first or the second frequency band is about 10 dBm.

Column 506, described as "ACPR at 7 dBm," describes the adjacent channel power ratio (ACPR), otherwise referred to as adjacent channel leakage ratio (ACLR), for the transmitter 304. The ACPR for the transmitter 304 is a performance characteristic of the transmitter 304 that is measured, or otherwise determined, when the transmitter 304 transmits the transmit signal in one of the first and second frequency bands. ACPR is a measurement of the amount of interference, or power, in an adjacent frequency channel for another device. ACPR is usually defined as the ratio of the average power in the adjacent frequency channel (or offset) to the average power in the transmitted frequency channel. ACPR is an important measurement for CDMA transmitters and their components. ACPR describes the amount of distortion generated due to non-linearities in RF components, such as elements in the transmitter 304. ACPR is a quantifiable method of measuring the spectral energy, adjacent to the user's channel, which is being passed through a nonlinear system. To acquire an ACPR of a system, the spectral energy in the bandwidth of the user's allocated transmission channel needs to be measured. Then the spectral energy in the adjacent channel needs to be measured. Once both measurements have been taken, the ratio of the two are calculated, hence the name ACPR. For example, an ACPR for the transmitter 304 to enable the transmitter 304 to transmit an appropriate signal in the one or both of the first or the second frequency band is about 53.6 at an output power of 7 dBm.

Columns 501, 502, and 503 describe information representing control signals provided by the controller 302 to the transmitter 304. Columns 504, 505, and 506 describe information representing measured performance data provided by the transmitter 304 to the controller 302 or other test equipment within or outside of the device 300. Therefore, for the control signals provided to the transmitter 304, as represented in columns 501, 502, and 503, the transmitter 304 provides measured performance data, as represented in columns 504, 505, and 506.

Row 507 describes the transmitter 304 receiving control signals for tuning capacitors 422 and 423, Ctune/Ctune2, each to 0 pF, setting the transmit signal, Tx IQ, baseband input power level to 0.6, and setting the transmit frequency band to 1.95 GHz for PCS (e.g., by selecting divider 114 and RF switch 430). Row 507 describes providing corresponding measured performance data of 25.68 mA for the driver amplifier 120, 10.13 dBm output power at the output of the RF switch 430, and 53.8 ACPR at 7 dBm. Row 507 may represent a default condition and/or an initial state of the transmitter 304. In row 507, the controls signals in columns 501, 502, and 503 provide appropriate corresponding measured performance data in columns 504, 505, and 506 to enable the transmitter 304 to transmit an appropriate signal in the second frequency band (e.g., high frequency band for PCS).

Row 508 describes the transmitter 304 receiving control signals for tuning capacitors 422 and 423, Ctune/Ctune2, each to 0 pF, setting the transmit signal, Tx IQ, baseband input power level to 0.6, and setting the transmit frequency to 850 MHz, and providing measured performance data of 20.69 mA for the driver amplifier 120, −14.40 dBm output power at the output of the RF switch 430, and not applicable (n/a) ACPR. In row 508, the values in columns 501 and 502 remain the same as in row 507, but the value column 503 changes to the first frequency band (e.g., 850 MHz for cellular). In row 508, the values in columns 501, 502, and 503 do not provide appropriate corresponding measured performance data in each of columns 504, 505, and 506 to enable the transmitter 304 to transmit an appropriate signal in the first frequency band (e.g., low frequency band for cellular). Therefore, further consideration of the values for the values, represented in columns 501 and 502, is needed, as shown in row 509.

Row 509 describes the transmitter 304 receiving control signals for tuning capacitors 422 and 423, Ctune/Ctune2, to 3.7/1.0 pF, respectively, setting the transmit signal, Tx IQ, baseband input power level to 0.6, and setting the transmit frequency to 850 MHz, and providing measured performance data of 21.86 mA for the driver amplifier 120, 4.04 dBm output power at the output of the RF switch 430, and 53.6 ACPR. In row 509, the values in columns 502 and 503 remain the same as in row 508, but the value column 501 changes to the values for the capacitors 422 and 423 (e.g., 3.7 pF and 1.0 pF, respectively). In row 509, the values in columns 501, 502, and 503 still do not provide appropriate corresponding measured performance data in each of columns 504 and 505, but is acceptable in column 506, to enable the transmitter 304 to transmit an appropriate signal in the first frequency band (e.g., low frequency band for cellular). Therefore, further consideration of the values for the values, represented in columns 501 and 502, is needed, as shown in row 510.

Row 510 describes the transmitter 304 receiving control signals for tuning capacitors 422 and 423, Ctune/Ctune2, to 3.7/1.0 pF, respectively, setting the transmit signal, Tx IQ, baseband input power level to 0.8, and setting the transmit frequency to 850 MHz, and providing measured performance data of 25.52 mA for the driver amplifier 120, 9.95 dBm output power at the output of the RF switch 430, and 53.6 ACPR. In row 510, the values in columns 501 and 503 remain the same as in row 509, but the value column 502 changes to the value for the baseband input power to 0.8. In row 510, the values in columns 501, 502, and 503 now provide appropriate corresponding measured performance data in each of columns 504, 505, and 506, to enable the transmitter 304 to transmit an appropriate signal in the first frequency band (e.g., low frequency band for cellular). As an alternative or in addition to changing the value for the baseband input power in column 502, the values of the capacitors 422, 423, and/or 427 may be changed in an attempt to provide appropriate corresponding measured performance data in each of columns 504, 505, and 506. However, the manufacturing process for the integrated circuit may limit the values needed for the capacitors 422, 423, and/or 427. Therefore, while desirable values for the capacitors 422, 423, and/or 427 may be provided outside of the RFIC 402, with or without adjusting the value for the power level of the input signal, it is desirable to keep the capacitors 422, 423, and/or 427 inside the RFIC 402 to minimize the cost and size of the device 300.

FIG. 6 illustrates a method 600 performed by the transmitter 304, as illustrated in FIG. 4, according to one aspect of the present invention. The transmitter 304 performs the method 600 in response to receiving control signals, otherwise referred to as instructions, commands, or values, from the controller 302. The controller 302 provides the control signals in response to receiving computer-readable instructions stored in the memory 308. The functions shown in FIG. 6 may be performed in a different order than shown, and some functions may be eliminated or modified depending on the design of the transmitter 304.

At block 601, the method 600 starts, for example, by way of continuing from another process for the device 300.

At block 602, the controller 302 selects a frequency band to cause the transmitter 304 to operate at the first transmit frequency band (e.g., a low frequency band, such as cellular frequency band) or at the second transmit frequency band (e.g., a high frequency band, such as PCS frequency band). The controller 302 selects the frequency band, for example, by performing the method described in sub-blocks 603, 604, and 605. Other selection methods may be implemented.

At block 603, the controller 302, via the frequency band selection 434 in the controller 302, provides control signals to control transmitter portion A by selecting the divider 112 (divide by 4) for the first transmit frequency (e.g., a low frequency band, cellular frequency), or by selecting the divider 114 (divide by 2) for the second transmit frequency (e.g., a high frequency band, PCS frequency).

At block 604, the controller 302, via the frequency band selection 434, provides control signals to control transmitter portion B by tuning the capacitors 422, Ctune, and 423, Ctune2, at the input to and output of, respectively, the transformer 118 to particular values. For example, the capacitors 422 and 423 are tuned to 3.7 pF and 1.0 pF, respectively, to enable the transmitter 304 to transmit an appropriate signal in the first frequency band (e.g., low frequency band for cellular). Further, for example, the capacitors 422 and 423 are each tuned to 0.0 pF to enable the transmitter 304 to transmit an appropriate signal in the second frequency band (e.g., high frequency band for PCS).

At block 605, the controller 302, via the frequency band selection 434 in the controller 302, provides control signals to control transmitter portion D by selecting either RF switch 428 for the first transmit frequency (e.g., a low frequency band for cellular), or by selecting RF switch 430 for the second transmit frequency (e.g., a high frequency band for PCS).

At block 606, the controller 302, via the frequency band selection 434, provides control signals to control transmitter portion D by tuning the capacitor 427, Ctune3, at the output matching network 426 to a particular value. For example, the capacitor 427 is tuned to a first appropriate value to enable the transmitter 304 to transmit an appropriate signal in the first frequency band (e.g., low frequency band for cellular). Further, for example, the capacitor 427 is tuned to a second appropriate value to enable the transmitter 304 to transmit an appropriate signal in the second frequency band (e.g., high frequency band for PCS).

At block 607, the controller 302, via the gain adjustment 436, provides control signals to control transmitter portion E by adjusting the baseband input power level of the transmit signal, Tx IQ, to a particular value. For example, the baseband input power level for transmit signal Tx IQ is adjusted be 0.8 to enable the transmitter 304 to transmit an appropriate signal in the first frequency band (e.g., low frequency band for cellular). Further, for example, the baseband input power level for transmit signal, Tx IQ, is adjusted be 0.6 to enable the transmitter 304 to transmit an appropriate signal in the second frequency band (e.g., high frequency band for PCS).

At block 609, the method 600 ends, for example, by way of continuing to another process for the device 300.

Figure 1:
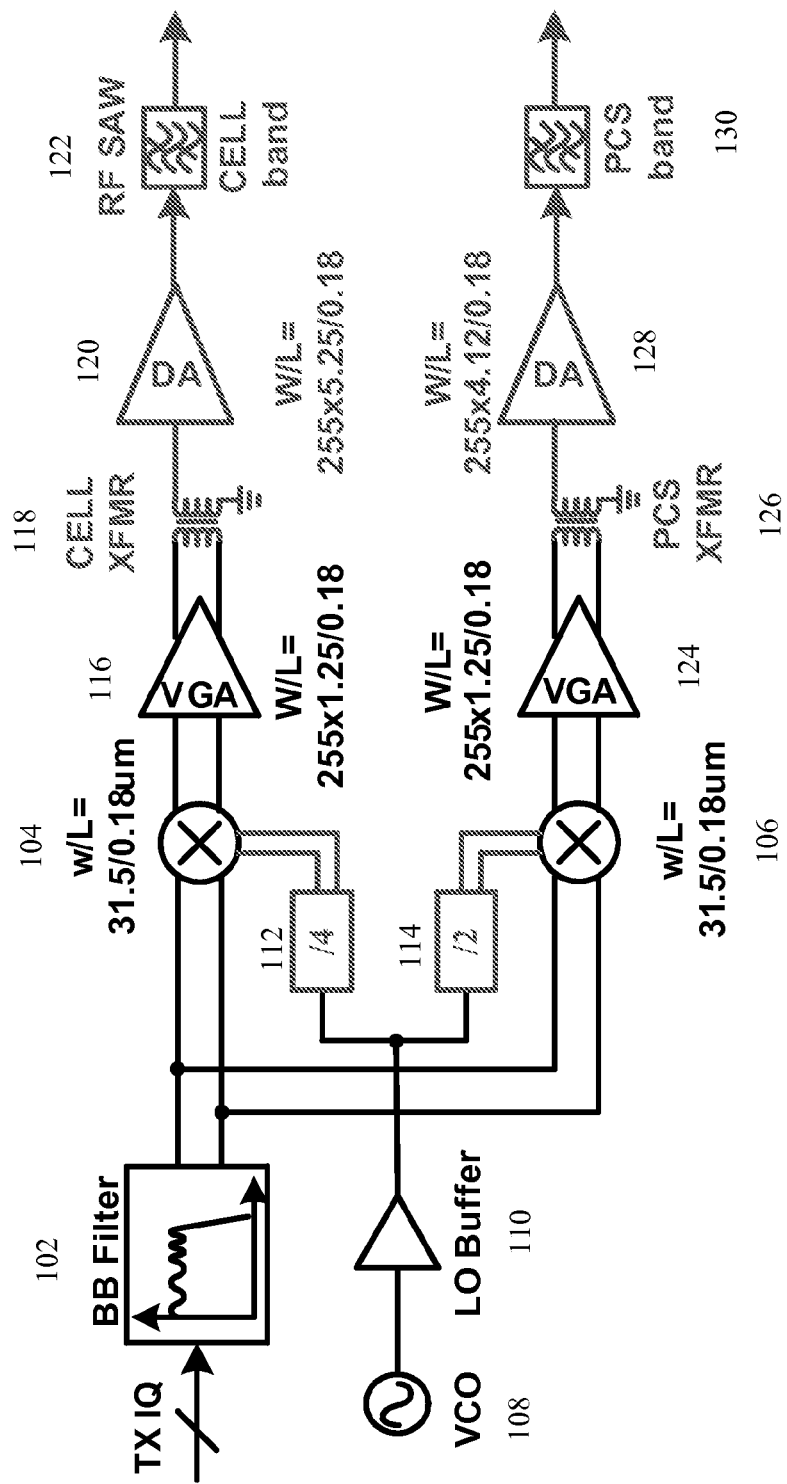
FIG. 1 illustrates a block diagram representation of a first radio frequency transmitter, according to the prior art.
Figure 2:
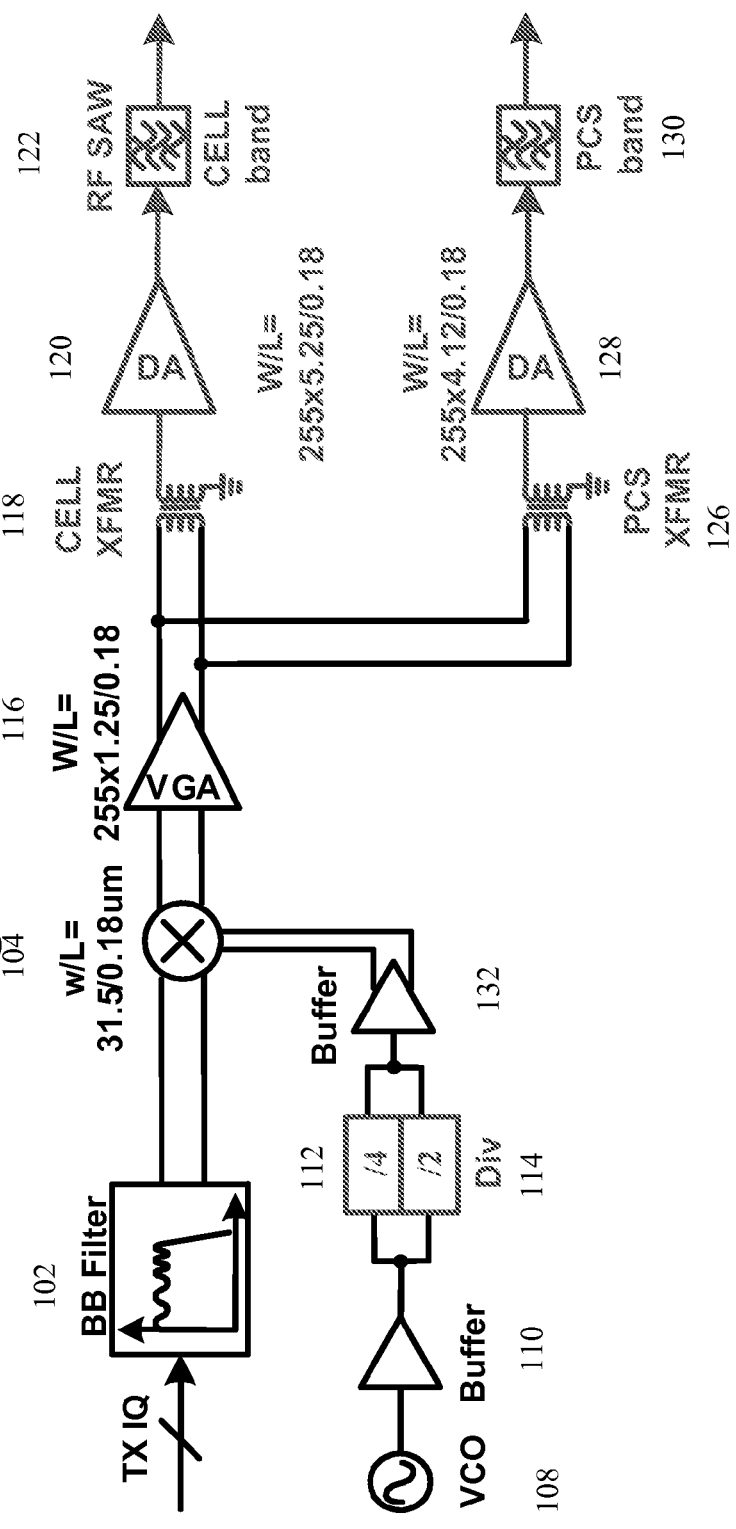
FIG. 2 illustrates a block diagram representation of a second radio frequency transmitter, according to the prior art.

The dual band transmitter 304 provides a single transmit signal path through the RFIC 402 along the path of the BB VGA 404, the baseband filter 102, the mixer 104, the VGA 116, the transformer 118, the driver amplifier 120, and the output matching network 426. The transmitter 304 has appropriate performance while transmitting in either the first transmit frequency band (e.g., cellular frequency band) or the second transmit frequency band (e.g., PCS frequency band). The single transmit signal path for both the first and second frequency bands is more compact than existing dual band transmitters 100 and 200, as shown in FIGS. 1 and 2, respectively, for example. These advances are made possible by implementing one or more of the techniques identified as A, B, C, D, and E on the RFIC 402. For example, the dual band transmitter 304 reduces the transmitter die size by 40% by only using one transformer 118 and one driver amplifier 120, when compared to the transmitter 200 shown in FIG. 2, thereby reducing the corresponding cost of the integrated circuit die and the cost and size of the integrated circuit package.

The system, elements, and/or processes contained herein may be implemented in hardware, software, or a combination of both, and may include one or more controllers. A controller is a device and/or set of machine-readable instructions for performing task. A controller may be any device, capable of executing a series of instructions embodying a process, including but not limited to a computer, a microprocessor, a processor, an application specific integrated circuit (ASIC), finite state machine, digital signal processor (DSP), or some other mechanism. The controller includes any combination of hardware, firmware, and/or software. The controller acts upon stored and/or received information by computing, manipulating, analyzing, modifying, converting, or transmitting information for use by an executable application or procedure or an information device, and/or by routing the information to an output device.

An executable application comprises machine code or machine readable instruction for implementing predetermined functions including, for example, those of an operating system, a software application program, or other information processing system, for example, in response user command or input.

An executable procedure is a segment of code (i.e., machine readable instruction), sub-routine, or other distinct section of code or portion of an executable application for performing one or more particular processes, and may include performing operations on received input parameters (or in response to received input parameters) and providing resulting output parameters.

In various embodiments, hardwired circuitry may be used in combination with software instructions to implement the present invention. Thus, the techniques are not limited to any specific combination of hardware circuitry and software, nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor.

It will be apparent from this description that aspects of the present invention may be embodied, at least in part, in software. That is, the techniques may be carried out in a computer system or other data processing system in response to its processor executing sequences of instructions contained in a machine-readable medium.

A machine-readable medium includes any mechanism that provides (i.e., stores and/or transmits) information in a form accessible by a machine (e.g., a computer, network device, personal digital assistant, computer, data processor, manufacturing tool, any device with a set of one or more processors, etc.). A machine-readable medium can be used to store software and data which, when executed by a data processing system, causes the system to perform various methods of the present invention. Portions of this executable software and/or data may be stored in various places. For example, a machine-readable medium includes recordable/non-recordable media (e.g., read only memory (ROM), random access memory (RAM), magnetic disk storage media, optical storage media, flash memory devices, non-volatile memory, cache, remote storage device, etc.), as well as electrical, optical, acoustical or other forms of propagated signals (e.g., carrier waves, radio frequency signals, infrared signals, digital signals, etc.), etc.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A transmitter comprising:
   a transformer adapted to transform a differential radio frequency (RF) signal to a single-ended RF signal;
   a transformer tuning circuit adapted to tune the transformer to permit the transmitter to transmit the single-ended RF signal in one of a first frequency band and a second frequency band, different from the first frequency band;
   at least one amplifier coupled to the transformer and operable over both the first and second frequency bands; and
   at least one switch coupled to an output of the at least one amplifier and adapted to connect the single-ended RF signal to one of a first transmit path and a second transmit path, the transformer, the at least one switch, and the at least one amplifier formed on a common integrated circuit.

2. The transmitter, according to claim 1, wherein the transformer tuning circuit comprises:
   a first capacitor adapted to tune an input side of the transformer, which is adapted to receive the differential RF signal.

3. The transmitter, according to claim 2, wherein the transformer tuning circuit comprises:
   a second capacitor adapted to tune an output side of the transformer, which is adapted to produce the single-ended RF signal.

4. The transmitter, according to claim 1, comprising:
   a mixer adapted to convert a differential baseband signal to the differential RF signal in response to receiving one of a first reference frequency signal and a second reference frequency signal to permit the transmitter to transmit the single-ended RF signal in one of the first frequency band and the second frequency band, respectively.

5. The transmitter, according to claim 1, comprising:
   an output matching network adapted to maintain an output impedance of the transmitter at a predetermined value to provide a desired output power level for the single-ended RF signal in one of the first frequency band and the second frequency band;
   an output matching network tuning circuit adapted to tune the output matching network to permit the transmitter to transmit the single-ended RF signal at the desired output power level in one of the first frequency band and the second frequency band.

6. The transmitter, according to claim 5, wherein the output matching network tuning circuit comprises:
   a third capacitor adapted to tune the output matching network.

7. The transmitter, according to claim 1, comprising:
   first and second switches adapted to connect the single-ended RF signal to one of a first transmit path and a second transmit path to permit the transmitter to transmit the single-ended RF signal in one of the first frequency band and the second frequency band, respectively.

8. The transmitter, according to claim 1, comprising:
   an amplifier adapted to adjust a gain of the differential RF signal to permit the transmitter to transmit the single-ended RF signal at a desired output power level in one of the first frequency band and the second frequency band, respectively.

9. The transmitter, according to claim 8, comprising:
   a power detector adapted to measure an output power level of a transmit signal, representative of the single-ended RF signal, transmitted by the transmitter,
   wherein the amplifier adjusts the gain of the differential RF signal in response to the output power level of the transmit signal.

10. The transmitter, according to claim 8, wherein the amplifier comprises:
    a baseband variable gain amplifier adapted to adjust a gain of a differential baseband signal before being converted to the differential RF signal.

11. The transmitter, according to claim 8, wherein the amplifier comprises:
    a radio frequency variable gain amplifier adapted to adjust the gain of the differential RF signal.

12. The transmitter, according to claim 1, wherein the first frequency band and the second frequency band comprise a cellular frequency band and a personal communication services (PCS) frequency band, respectively.

13. A transmitter comprising:
    a baseband filter adapted to filter a differential baseband signal to produce a filtered differential baseband signal;
    a mixer adapted to convert the filtered differential baseband signal to a differential RF signal in response to receiving one of a first reference frequency signal and a second reference frequency signal to permit the transmitter to transmit a single-ended RF signal in one of the first frequency band and the second frequency band, respectively
    an amplifier adapted to adjust a gain of the differential RF signal to permit the transmitter to transmit the single-ended RF signal at a desired output power level in one of the first frequency band and the second frequency band, respectively;
    a transformer adapted to transform the differential RF signal to the single-ended RF signal;
    a transformer tuning circuit adapted to tune the transformer to permit the transmitter to transmit the single-ended RF signal in one of the first frequency band and the second frequency band;
    a driver amplifier adapted to amplify the single-ended RF signal, at least one of the amplifier and the driver amplifier coupled to the transformer and operable over both the first and second frequency bands;
    an output matching network adapted to maintain an output impedance of the transmitter at a predetermined value to provide the desired output power level for the single-ended RF signal in one of the first frequency band and the second frequency band;
    an output matching network tuning circuit adapted to tune the output matching network to permit the transmitter to transmit the single-ended RF signal at the desired output power level in one of the first frequency band and the second frequency band; and
    first and second switches adapted to connect the single-ended analog RF signal to one of a first transmit path and a second transmit path to permit the transmitter to transmit the single-ended analog RF signal in one of the first frequency band and the second frequency band, respectively, the transformer, the first and second switches, and at least one the amplifier and the driver amplifier formed on a common integrated circuit.

14. The transmitter, according to claim 13, wherein the transmitter comprises an integrated circuit on a semiconductor die.

15. The transmitter, according to claim 13, wherein the transformer tuning circuit comprises:
a first capacitor adapted to tune an input side of the transformer, which is adapted to receive the differential RF signal.

16. The transmitter, according to claim 15, wherein the transformer tuning circuit comprises:
a second capacitor adapted to tune an output side of the transformer, which is adapted to produce the single-ended RF signal.

17. The transmitter, according to claim 13, wherein the output matching network tuning circuit comprises:
a third capacitor adapted to tune the output matching network.

18. The transmitter, according to claim 13, comprising:
a power detector adapted to measure an output power level of a transmit signal, representative of the single-ended RF signal, transmitted by the transmitter,
wherein the amplifier adjusts the gain of the differential RF signal in response to the output power level of the transmit signal.

19. The transmitter, according to claim 13, wherein the amplifier comprises:
a baseband variable gain amplifier adapted to adjust a gain of a differential baseband signal before being converted to the differential RF signal.

20. The transmitter, according to claim 13, wherein the amplifier comprises:
a radio frequency variable gain amplifier adapted to adjust the gain of the differential RF signal.

21. The transmitter, according to claim 13, wherein the first frequency band and the second frequency band comprise a cellular frequency band and a personal communication services (PCS) frequency band, respectively.

22. A method for operating a transmitter comprising:
transforming a differential radio frequency (RF) signal to a single-ended RF signal;
tuning the transformer to permit the transmitter to transmit the single-ended RF signal in one of a first frequency band and a second frequency band, different from the first frequency band;
amplifying one of the differential RF signal and the single-ended RF signal over one of the first and second frequency bands; and
connecting the single-ended analog RF signal to one of a first transmit path and a second transmit path, the transforming, connecting, and amplifying configured to occur on a common integrated circuit.

23. The method for operating a transmitter according to claim 22, further comprising:
filtering the differential baseband signal to filtered differential baseband signal;
converting the filtered differential baseband signal to a differential RF signal in response to receiving one of a first reference frequency signal and a second reference frequency signal to permit the transmitter to transmit the single-ended RF signal in one of the first frequency band and the second frequency band, respectively
adjusting a gain of the differential RF signal to permit the transmitter to transmit the single-ended RF signal at a desired output power level in one of the first frequency band and the second frequency band, respectively;
amplifying the single-ended RF signal;
maintaining an output impedance of the transmitter at a predetermined value to provide the desired output power level for the single-ended RF signal in one of the first frequency band and the second frequency band;
tuning the output matching network to permit the transmitter to transmit the single-ended RF signal at the desired output power level in one of the first frequency band and the second frequency band; and
connecting the single-ended analog RF signal to one of a first transmit path and a second transmit path to permit the transmitter to transmit the single-ended analog RF signal in one of the first frequency band and the second frequency band, respectively.

24. A wireless communication device, comprising:
a transmitter comprising:
a transformer adapted to transform a differential radio frequency (RF) signal to a single-ended RF signal;
a transformer tuning circuit adapted to tune the transformer to permit the transmitter to transmit the single-ended RF signal in one of a first frequency band and a second frequency band, different from the first frequency band;
at least one amplifier coupled to the transformer and operable over both the first and second frequency bands, the transformer and the at least one amplifier formed on a common integrated circuit; and
at least one switch coupled to an output of the at least one amplifier and adapted to connect the single-ended RF signal to one of a first transmit path and a second transmit path, the transformer, the at least one switch, and the at least one amplifier formed on a common integrated circuit; and
a controller adapted to select one of the first frequency band and the second frequency band by controlling the transformer tuning circuit and adapted to adjust a gain of the differential RF signal to permit the transmitter to transmit the single-ended RF signal at a desired output power level in one of the first frequency band and the second frequency band.

25. A signal bearing medium embodying a set of machine-readable instructions executable by a data processor for controlling a transmitter adapted to transmit a signal in one of a first frequency band and a second frequency band, different from the first frequency band, comprising:
selecting one of a first reference frequency signal and a second reference frequency signal for converting a differential baseband signal to a differential RF signal to permit the transmitter to transmit a single-ended RF signal in one of the first frequency band and the second frequency band, respectively;
adjusting a gain of at least one of the differential baseband signal and the differential RF signal to permit the transmitter to transmit the single-ended RF signal at a desired output power level in one of the first frequency band and the second frequency band, respectively;
tuning a transformer, adapted to transform the differential RF signal to the single-ended RF signal, to permit the transmitter to transmit the single-ended RF signal in one of the first frequency band and the second frequency band;
amplifying one of the differential RF signal and the single-ended RF signal over one of the first and second frequency bands;
tuning an output matching network to permit the transmitter to transmit the single-ended RF signal at the desired output power level in one of the first frequency band and the second frequency band; and connecting the single-ended RF signal to one of a first transmit path and a second transmit path to permit the transmitter to transmit the single-ended analog RF signal in one of the first frequency band and the second frequency band, respectively, the transforming, connecting, and amplifying configured to occur on a common integrated circuit.

26. A transmitter comprising:

means for transforming a differential radio frequency (RF) signal to a single-ended RF signal;

means for tuning the transformer to permit the transmitter to transmit the single-ended RF signal in one of a first frequency band and a second frequency band, different from the first frequency band;

means for amplifying one of the differential RF signal and the single-ended signal over one of the first and second frequency bands; and means for connecting the single-ended analog RF signal to one of a first transmit path and a second transmit path, the transforming, connecting, and amplifying configured to occur on a common integrated circuit.

* * * * *